United States Patent
Miyashita et al.

(10) Patent No.: US 10,933,583 B2
(45) Date of Patent: Mar. 2, 2021

(54) METHOD OF MANUFACTURING THREE-DIMENSIONAL SHAPED OBJECT

(71) Applicant: SEIKO EPSON CORPORATION, Tokyo (JP)

(72) Inventors: Takeshi Miyashita, Nagano (JP); Naoko Shima, Nagano (JP); Jun Takizawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/737,998

(22) Filed: Jan. 9, 2020

(65) Prior Publication Data

US 2020/0223134 A1 Jul. 16, 2020

(30) Foreign Application Priority Data

Jan. 11, 2019 (JP) .............................. JP2019-003634

(51) Int. Cl.
| | |
|---|---|
| B29C 64/188 | (2017.01) |
| B33Y 10/00 | (2015.01) |
| B29C 64/165 | (2017.01) |
| B29C 64/153 | (2017.01) |
| B28B 1/00 | (2006.01) |
| B33Y 30/00 | (2015.01) |
| B29C 64/112 | (2017.01) |

(52) U.S. Cl.
CPC ............ B29C 64/188 (2017.08); B28B 1/001 (2013.01); B29C 64/153 (2017.08); B29C 64/165 (2017.08); B33Y 10/00 (2014.12); B29C 64/112 (2017.08); B33Y 30/00 (2014.12)

(58) Field of Classification Search
None
See application file for complete search history.

(56) References Cited

U.S. PATENT DOCUMENTS

| | | | |
|---|---|---|---|
| 2009/0068376 A1 | 3/2009 | Philippi et al. | |
| 2015/0298211 A1 | 10/2015 | Abe et al. | |
| 2016/0089720 A1* | 3/2016 | Kamakura | B22F 1/0062 419/53 |
| 2017/0129012 A1* | 5/2017 | Ishida | B22F 3/1055 |
| 2018/0071989 A1* | 3/2018 | Zenou | B29C 64/40 |
| 2019/0224750 A1* | 7/2019 | Dohler | B29C 64/393 |

FOREIGN PATENT DOCUMENTS

| | | |
|---|---|---|
| JP | 4694617 B2 | 6/2011 |
| JP | 4915660 B2 | 4/2012 |
| JP | 2015-017294 A | 1/2015 |

* cited by examiner

Primary Examiner — Mary Lynn F Theisen
(74) Attorney, Agent, or Firm — Global IP Counselors, LLP

(57) ABSTRACT

A method of manufacturing a three-dimensional shaped object in which the three-dimensional shaped object is manufactured by laminating layers includes: a layer formation step of forming layers using a material containing powder and a binder; a removal step of removing a portion of the material in a boundary region including at least one of an end portion of a shaping region of the three-dimensional shaped object in the layer and an outer portion of the shaping region adjacent to the end portion by irradiating the boundary region with a laser; and a melting and solidifying step of melting and solidifying the material after melting in the shaping region by performing irradiation with the laser.

7 Claims, 12 Drawing Sheets

METHOD OF MANUFACTURING THREE-DIMENSIONAL SHAPED OBJECT

The present application is based on, and claims priority from JP Application Serial Number 2019-003634, filed Jan. 11, 2019, the disclosure of which is hereby incorporated by reference herein in its entirety.

BACKGROUND

1. Technical Field

The present disclosure relates to a method of manufacturing a three-dimensional shaped object.

2. Related Art

In the related art, there are various types of method of manufacturing a three-dimensional shaped object. Among those, there is a method of manufacturing a three-dimensional shaped object in which a layer is formed, the layer is irradiated with a laser to be melted, and then, the layer is solidified in order to manufacture a three-dimensional shaped object. For example, in JP-A-2015-17294, a method of manufacturing a three-dimensional shaped object in which a powder layer is formed, the powder layer is irradiated with a light beam to be melted, and then, the power layer is solidified in order to manufacture the three-dimensional shaped object.

In a method of manufacturing the three-dimensional shaped object disclosed in JP-A-2015-17294, sucking and removing processing for sucking and removing the powder around the three-dimensional shaped object and cutting processing for cutting a surface of the three-dimensional shaped object are performed. Even though a high-quality three-dimensional shaped object can be manufactured by performing the above-described processing, however, since the number of processing increases, the manufacturing load of the three-dimensional shaped objects increases.

SUMMARY

A method of manufacturing a three-dimensional shaped object according to an aspect of the present disclosure is a method of manufacturing a three-dimensional shaped object in which the three-dimensional shaped object is manufactured by laminating layers. The method includes: a layer formation step of forming layers using a material containing powder and binder; a removal step of removing a portion of the material in a boundary region including at least one of an end portion of a shaping region of the three-dimensional shaped object in the layer and an outer portion of the shaping region adjacent to the end portion by irradiating the boundary region with a laser; and a melting and solidifying step of melting and solidifying the material after melting in the shaping region by performing the irradiation with the laser.

DESCRIPTION OF EXEMPLARY EMBODIMENTS

Figure 1:
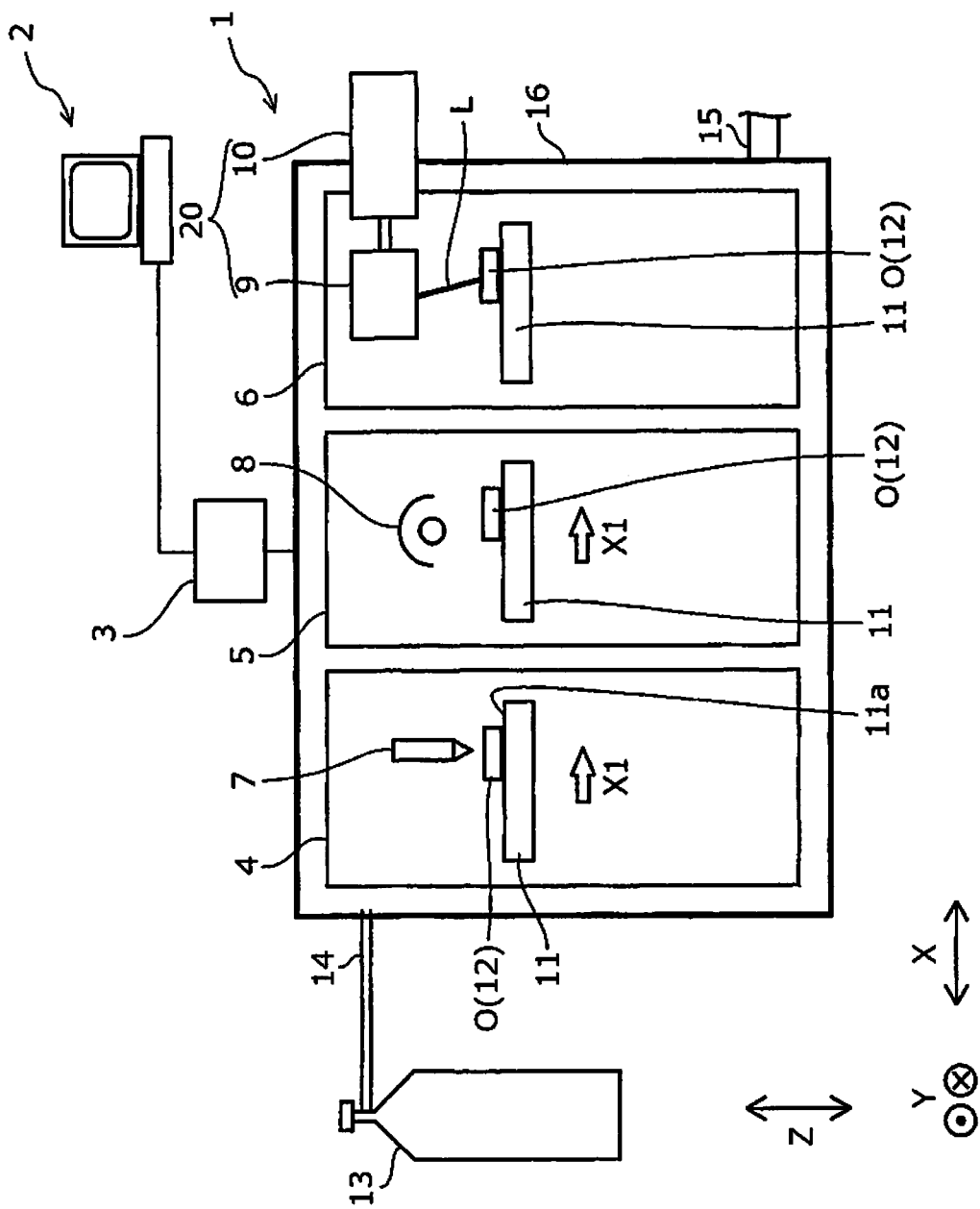
FIG. 1 is a schematic configuration diagram illustrating a configuration of a three-dimensional shaped object manufacturing apparatus according to an embodiment configured to perform a method of manufacturing a three-dimensional shaped object in the present disclosure.

First, the present disclosure will be briefly described.

According to a first aspect of the present disclosure, there is provided a method of manufacturing a three-dimensional shaped object in which the three-dimensional shaped object is manufactured by laminating layers. The method includes: a layer formation step of forming layers using a material containing powder and binder; a removal step of removing a portion of the material in a boundary region including at least one of an end portion of a shaping region of the three-dimensional shaped object in the layer and an outer portion of the shaping region adjacent to the end portion by irradiating the boundary region with a laser; and a melting and solidifying step of melting and solidifying the material after melting in the shaping region by performing irradiation with the laser.

When the layer is irradiated with the laser to melt the material, the material is melted by drawing the material around the laser irradiation position. Therefore, at the position of the first line when moving the laser irradiation position in a line shape, or at the position of the laser irradiation start position, there is a tendency that much of the material is drawn and melted because there is material all around those positions and that the protruding portion is generated in the layer. When the protruding portion is generated, the manufacturing accuracy of the three-dimensional shaped object decreases. On the other hand, in the present aspect, since a part of the material in the boundary region is removed in the removal step, it is possible to prevent the protruding portion from being generated. Therefore, it is possible to manufacture a high-quality three-dimensional shaped object. Since both the removal step and the melting and solidifying step are performed by irradiating the layer with the laser, since these can be considered as one irradiation processing with the laser, it is possible to suppress the increase of number of processing. That is, according to the present aspect, it is possible to manufacture a high-quality three-dimensional shaped object without increasing the number of processing.

A second aspect of the present disclosure provides the method of manufacturing a three-dimensional shaped object according to the first aspect, in which a laser irradiation position in the removal step may include the boundary region in a laser irradiation start position in the melting and solidifying step.

According to the present aspect, the laser irradiation position in the removal step includes the boundary region in the laser irradiation start position in the melting and solidifying step. That is, it is possible to remove a part of the material at the laser irradiation start position in the melting and solidifying step in which the protruding portion is easily generated. Therefore, it is possible to effectively prevent the protruding portion from being generated in the layer.

A third aspect of the present disclosure provides the method of manufacturing a three-dimensional shaped object according to the first aspect, in which the irradiation with the laser in the melting and solidifying step may be performed by moving the laser irradiation position in a line shape, and a laser irradiation position in the removal step may include the boundary region in a width direction of the line.

According to the present aspect, the laser irradiation position in the removal step can include the boundary region in the width direction of the line. When moving the laser irradiation position in a line shape in the melting and solidifying step, the protruding portion is easily generated at the first line accompanying especially with the laser irradiation on the first line. However, since a part of the material of the boundary region in the width direction of the line, that is, for example, a part of the material of the boundary region on the first line side can be removed, and thus, it is possible to effectively prevent the protruding portion from being generated in the layer.

A fourth aspect of the present disclosure provides the method of manufacturing a three-dimensional shaped object according to the first aspect, in which a laser irradiation position in the removal step may include the boundary region around the entire shaping region.

According to the present aspect, the laser irradiation position in the removal step can include the boundary region around the entire shaping region. Since a part of the material is removed in all the areas where the protruding portion is easily generated, it is possible to effectively prevent the protruding portion from being generated in the layer.

A fifth aspect of the present disclosure provides the method of manufacturing a three-dimensional shaped object according to the first aspect, in which a laser intensity in the removal step may be an intensity at which a laser irradiation position is heated equal to or higher than a thermal decomposition temperature of the binder.

According to the present aspect, a laser intensity in the removal step is the intensity at which the laser irradiation position is heated equal to or higher than the thermal decomposition temperature of the binder. Therefore, the binder at the laser irradiation position can be thermally decomposed and thus, it is possible to effectively remove a part of the material at that position.

A sixth aspect of the present disclosure provides the method of manufacturing a three-dimensional shaped object according to the first aspect, in which a laser intensity in the removal step may be lower than an intensity at which energy of irradiation with the laser reaches beyond one layer of the layers.

According to the present aspect, the laser intensity in the removal step is lower than the intensity at which the energy of irradiation with the laser reaches beyond one layer of the layers. By setting the laser intensity as described above, it is possible to suppress the occurrence of the material removal failure during the removal step due to the molten residue of the layer remaining on the laser irradiation position.

Hereinafter, an embodiment of the present disclosure will be described with reference to the accompanying drawings.

First, an overview of a three-dimensional shaped object manufacturing apparatus 1 configured to perform a method of manufacturing a three-dimensional shaped object in the present disclosure will be described with reference to FIG. 1.

Here, the X direction in the figure is a horizontal direction, and the Y direction is a horizontal direction and a direction orthogonal to the X direction. In addition, the Z direction is a vertical direction and corresponds to the laminate direction of a layer 12 illustrated in FIG. 3.

The three-dimensional shaped object manufacturing apparatus 1 in the present embodiment is a three-dimensional shaped object manufacturing apparatus that manufactures a three-dimensional shaped object O by laminating the layer 12. As illustrated in FIG. 1, the three-dimensional shaped object manufacturing apparatus 1 in the present embodiment includes an injector 7, a shaping stand 11, a dryer 8, and a laser emitter 20, which will be described later, and a controller 3 that controls the drive and movement of those units. In addition, as illustrated in FIG. 1, the three-dimensional shaped object manufacturing apparatus 1 in the present embodiment included a housing 16 that creates a sealed space inside, and a gas tube 14 that can introduce nitrogen gas into the inside of the housing 16 from a cylinder 13, and a gas tube 15 for discharging the gas inside the housing 16.

In addition, the injector 7 in the present embodiment is configured to inject a fluid material (fluid material) including a powder constituting the three-dimensional shaped object O, a solvent, and binder in a droplet state. Furthermore, the injector 7 in the present embodiment is configured to inject a fluid support material that supports the fluid material at an end portion of the layer 12 in a droplet state, in addition to the fluid material, if necessary.

As illustrated in FIG. 1, the injector 7 in the present embodiment is provided on an injector unit 4. In addition, the injector 7 in the present embodiment is configured to discharge the fluid material and the support material while moving in the Y direction, and is configured to move along the Z direction, and thus, the injector 7 is configured to adjust a gap with the shaping stand 11.

In addition, the shaping stand 11 in the present embodiment is movable along the X direction, and thus, the layer 12 is formed on a shaping surface 11a by the fluid material injected from the injector 7. Here, the shaping stand 11 is configured to move from the injector unit 4 to a drying unit 5 to be described later and further to a laser unit 6 by moving in the X1 direction of the X direction. Furthermore, the shaping stand 11 can also move in the direction opposite to the X1 direction of the X direction, therefore, the shaping stand 11 can return to the injector unit 4 again after completion of forming of the layer 12 by the injector unit 4, drying of the layer 12 by the drying unit 5, and irradiation of the layer 12 with a laser L by the laser unit 6, in order to form the next layer 12.

In addition, the dryer 8 in the present embodiment is configured to dry the layer 12 by volatilizing the solvent contained in the layer 12 formed in the shaping stand 11. The dryer 8 in the present embodiment is a line heater extending along the Y direction, and is configured to irradiate the layer 12 formed on the shaping stand 11 with infrared rays to dry the layer 12. However, the dryer 8 is not limited to such a configuration, and may be a configuration other than a line heater, and may have a configuration other than a configuration in which the irradiation is performed with electromagnetic waves such as the infrared rays. As illustrated in FIG. 1, the dryer 8 in the present embodiment is provided on the drying unit 5.

The laser emitter 20 in the present embodiment is configured with a laser generator 10 and a galvanometer mirror 9. Here, the galvanometer mirror 9 is configured to change the arrangement of a mirror (not illustrated) provided therein within a range of a predetermined angle, and is configured to move along the Z direction. With such a configuration described above, focusing of a laser L can be continued to maintain even when the layer 12 is laminated, and thus, the entire range of the shaping surface 11a can be irradiated with the laser L. In addition, as illustrated in FIG. 1, the laser emitter 20 in the present embodiment is provided on the laser unit 6.

Here, as illustrated in FIG. 1, in the three-dimensional shaped object manufacturing apparatus 1 in the present embodiment, the shaping stand 11 is arranged such that the shaping surface 11a is in the horizontal direction at any of the time when the fluid material is injected from the injector 7 to form the layer 12 on the shaping surface 11a, when the layer 12 is dried by emitting the infrared rays from the dryer 8, and when the laser L is emitted from the laser emitter 20.

Next, the fluid material that can be used in the three-dimensional shaped object manufacturing apparatus 1 in the present embodiment will be described in detail.

As the constituent material (powder) of the three-dimensional shaped object O, for example, a single powder of magnesium (Mg), iron (Fe), cobalt (Co), chromium (Cr), aluminum (Al), titanium (Ti), copper (Cu), nickel (Ni), or mixed powders such as alloys containing equal to or more than one of these metals (maraging steel, stainless steel (SUS), cobalt chromium molybdenum, a titanium alloy, a nickel alloy, an aluminum alloy, a cobalt alloy, a cobalt chromium alloy) and the like can be used as a paste-like mixed material containing the binder.

In addition, general-purpose engineering plastics such as polyimide, polyacetal, polycarbonate, modified polyphenylene ether, polybutylene terephthalate, and polyethylene terephthalate can be used. Furthermore, engineering plastics (resins) such as polysulfone, polyethersulfone, polyphenylene sulfide, polyarylate, polyimide, polyamideimide, polyetherimide, and polyetheretherketone can also be used.

As above, the constituent material of the three-dimensional shaped object O is not particularly limited, and metals other than the above metals, ceramics, resins, and the like can also be used. In addition, silicon dioxide, titanium dioxide, aluminum oxide, zirconium oxide and the like can also be preferably used.

Furthermore, fibers such as cellulose can also be used.

As the binder, for example, acrylic resin, epoxy resin, silicone resin, cellulosic resin or other synthetic resin, PLA (polylactic acid), PA (polyamide), PPS (polyphenylene sulfide) or other thermoplastic resin can be used alone or can be used in combination.

In addition, the fluid material may further contain solvents, and examples of the solvents preferably include: water; (poly) alkylene glycol monoalkyl ethers such as ethylene glycol monomethyl ether, ethylene glycol monoethyl ether, propylene glycol monomethyl ether, propylene glycol monoethyl ether; acetate ester such as ethyl acetate, n-propyl acetate, iso-propyl acetate, n-butyl acetate, iso-butyl acetate; aromatic hydrocarbons such as benzene, toluene, xylene; ketones such as methyl ethyl ketone, acetone, methyl isobutyl ketone, ethyl-n-butyl ketone, diisopropyl ketone; acetylacetone; alcohols such as ethanol, propanol, butanol; tetraalkylammonium acetates; sulfoxide solvents such as dimethyl sulfoxide and diethyl sulfoxide; pyridine solvents such as pyridine, γ-picoline, 2, 6-lutidine; ionic liquids such as tetraalkylammonium acetate (for example, tetrabutylammonium acetate), and the like, and one or a combination of two or more materials selected from above can be used.

In addition, the physical properties of the fluid material that can be used in the three-dimensional shaped object manufacturing apparatus 1 in the present embodiment are not particularly limited, but for example, if the fluid material is placed on a horizontal surface and is deformed such that the lower side is spread wider than the upper side due to the influence of gravity, the fluid material is not limited to a liquid and may be in the form of a gel. However, the material having a viscosity of equal to or higher than 500 mPa·s and equal to or lower than 100000 mPa·s in a low shear speed region is particularly preferable to be used.

Next, an application example of the method of manufacturing the three-dimensional shaped object performed using the above-described three-dimensional shaped object manufacturing apparatus 1 will be described with reference to a flowchart in FIG. 2 and FIG. 3 to FIG. 12. Here, in the method of manufacturing the three-dimensional shaped object in the present application example, for example, in the removal step in STEP S140 described later, a part of the fluid material at the irradiation position is irradiated with the laser L continuously moving in a line shape in the arrow direction NO as illustrated in FIG. 9, and FIG. 11, or with the laser L intermittently moving in a line shape in the arrow direction NO as illustrated in FIG. 12, so as to be removed from the layer 12 while. In addition, in the method of manufacturing the three-dimensional shaped object in the present application example, for example, in the melting and solidifying step in STEP S150 described later, the constituent material of the three-dimensional shaped object O is melted at the irradiation position by irradiating the layer 12 with the laser L moving in a line shape in the arrow direction N1, the arrow direction N2, and so on along the X direction as illustrated in FIG. 9, FIG. 11 and FIG. 12. Hereinafter, the irradiation trajectory with the laser L performed by moving in the line shape is simply referred to as a line.

Figure 2:
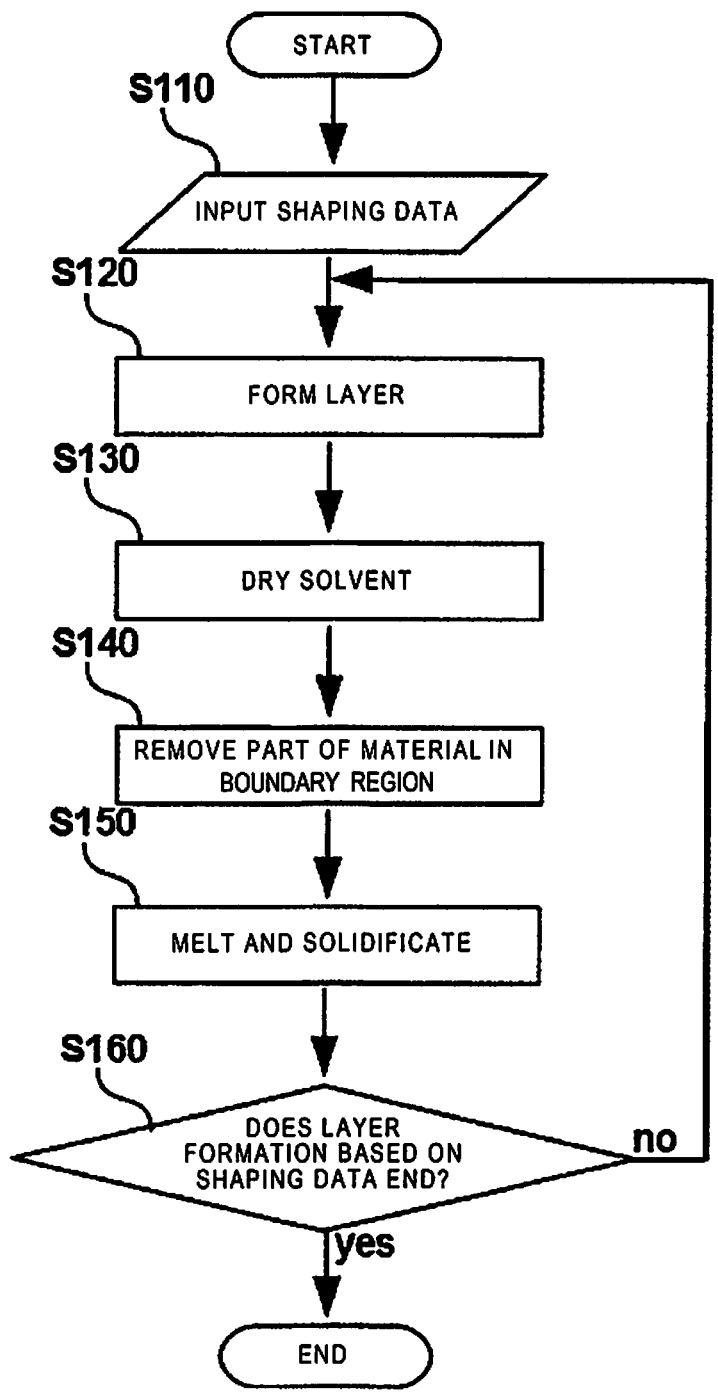
FIG. 2 is a flowchart of the method of manufacturing the three-dimensional shaped object according to an embodiment of the present disclosure.

In the method of manufacturing the three-dimensional shaped object in the present application example, first, in shaping data input processing in STEP S110 illustrated in the flowchart in FIG. 2, the shaping data for the three-dimensional shaped object to be manufactured is input. An input source of the shaping data for the three-dimensional shaped object is not particularly limited, but the shaping data can be input to the three-dimensional shaped object manufacturing apparatus 1 using a PC or the like.

Next, in the layer formation step in STEP S120, the layer 12 is formed on the shaping stand 11 by injecting the fluid material from the injector 7 illustrated in FIG. 1. The state as a result of performing this STEP is as illustrated in the top state diagram in FIG. 3.

Next, in solvent drying processing in STEP S130, the dryer 8 dries the solvent contained in the fluid material forming the layer 12. However, in the method of manufacturing the three-dimensional shaped object in the present application example, this STEP can be omitted.

Figure 3:
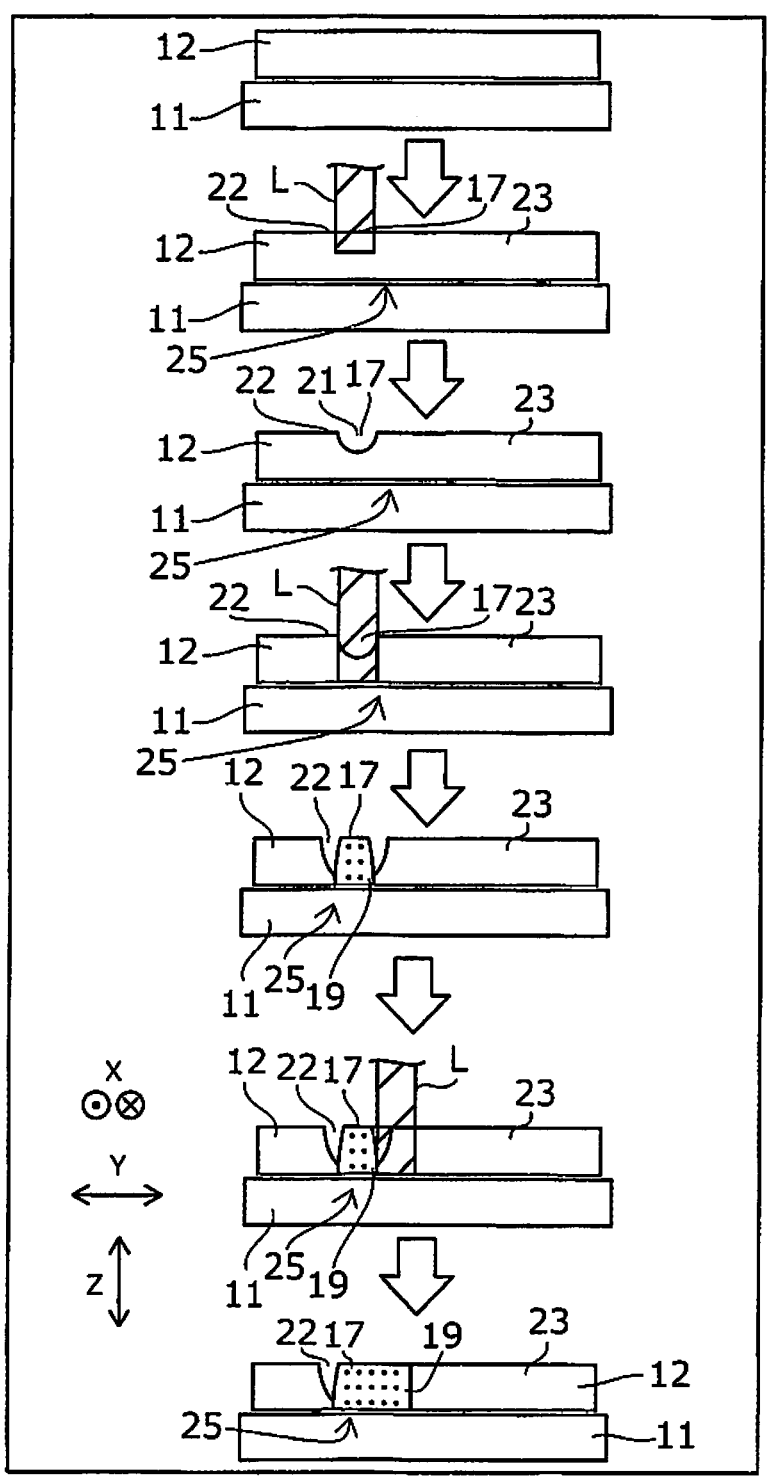
FIG. 3 is a cross-sectional view of a layer when a removal step is performed in the method of manufacturing the three-dimensional shaped object according to an embodiment of the present disclosure.
Figure 5:
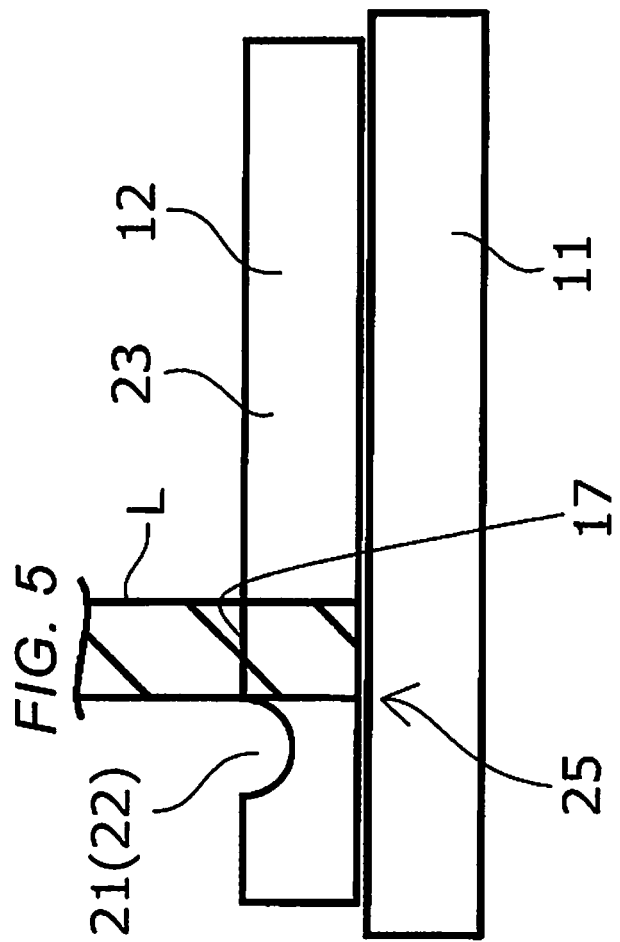
FIG. 5 is a cross-sectional view of a layer illustrating another example of a laser irradiation position in the removal step in the method of manufacturing a three-dimensional shaped object according to an embodiment of the present disclosure.
Figure 6:
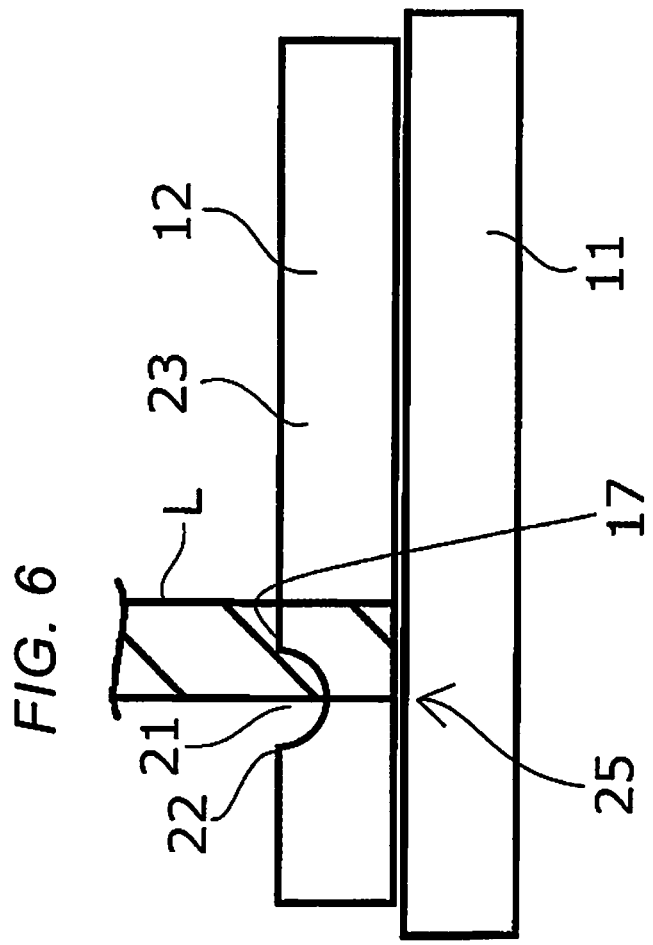
FIG. 6 is a cross-sectional view of a layer illustrating another example of a laser irradiation position in the removal step in the method of manufacturing a three-dimensional shaped object according to an embodiment of the present disclosure.

Next, in the removal step in STEP S140, by irradiating at least a part of the boundary region 25 including at least one of the end portion 17 of a shaping region 23 of the three-dimensional shaped object O in the layer 12 and an outer portion 22 of the shaping region 23 adjacent to the end portion 17 with the laser L, and by scattering a part of the fluid material, a part of the fluid material in the boundary region 25 is removed. By performing this STEP, for example, the state is changed from a state in the second state diagram from the top of FIG. 3 to a state in the third state diagram from the top of FIG. 3, and a recess portion 21 is formed in the layer 12. In FIG. 3, as can be seen by referring to the fourth state diagram from the top of FIG. 3, after removing a part of the fluid material by irradiating the position corresponding to the end portion 17 of the shaping region 23 with the laser L in the removal step in STEP S140, the fluid material is melted and solidified by performing the irradiation with the laser L again. However, as illustrated in FIG. 5, a part of the fluid material in the outer portion 22 of the shaping region 23 may be removed, or as illustrated in FIG. 6, a part of the fluid material at a position relating to both the end portion 17 of the shaping region 23 and the outer portion 22 of the shaping region 23, may be scattered.

Here, it is preferable that the laser intensity in the removal step in STEP S140 is an intensity at which the laser L irradiation position is heated to a temperature higher than a thermal decomposition temperature of the binder contained in the fluid material. That is because, by setting the intensity as described above, the binder at the laser L irradiation position can be thermally decomposed and the fluid material can be scattered, and thus, it is possible to effectively remove a part of the fluid material at that position.

In addition, it is preferable that the laser intensity in the removal step in STEP S140 is an intensity lower than the intensity at which the energy of irradiation with the laser L reaches beyond one layer of the layer 12. That is because, by setting the intensity as described above, a molten residue 24 of the layer 12 remains on the laser L irradiation position, and thus, it is possible to suppress the occurrence of fluid material removal failure during the removal step.

Figure 7:
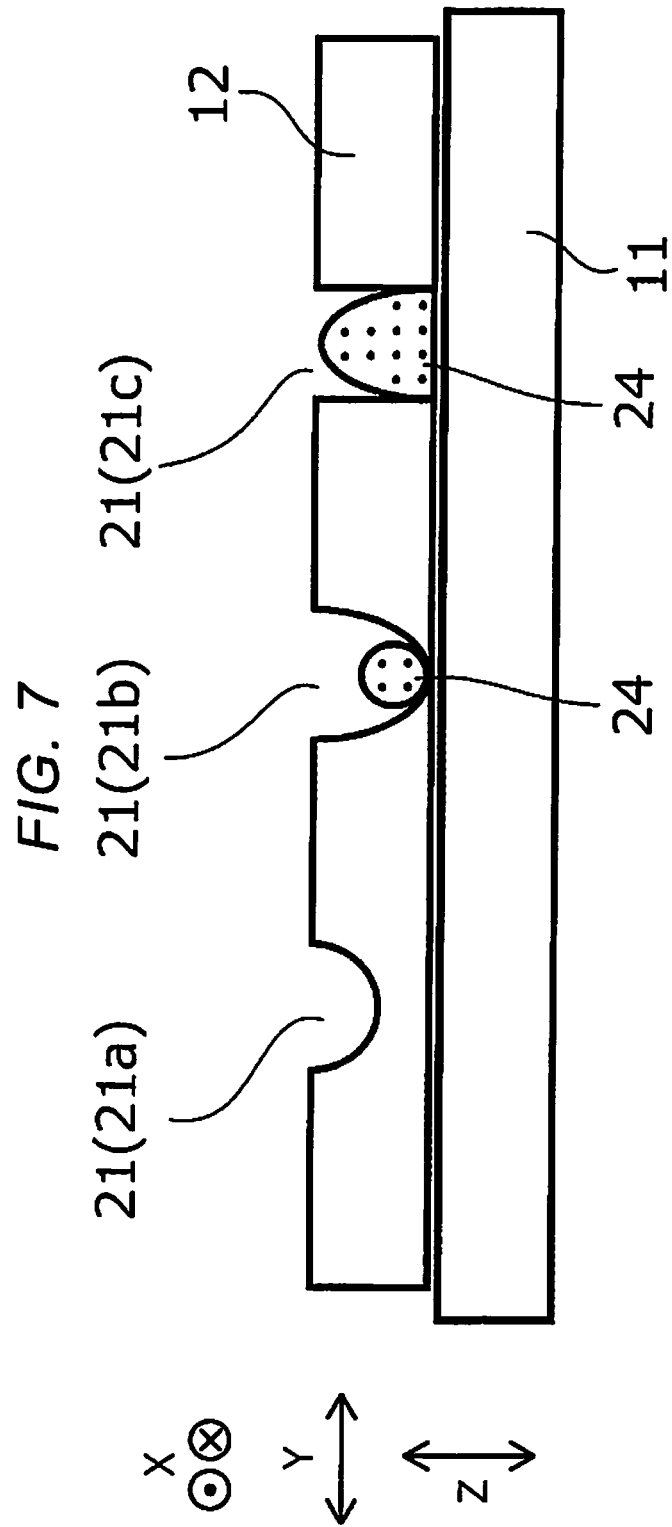
FIG. 7 is a cross-sectional view of a layer illustrating an example of a laser irradiation intensity in the removal step in the method of manufacturing a three-dimensional shaped object according to an embodiment of the present disclosure.

Here, a recess portion 21a is illustrated in FIG. 7, which is a formation state of the recess portion 21 when the laser L is emitted at the preferred laser intensity which is the intensity lower than the intensity at which the energy of irradiation with the laser L reaches beyond one layer of the layer 12. In addition, a recess portion 21b and a recess portion 21c are illustrated in FIG. 7, which are formation states of the recess 21 when the laser L is emitted at the unpreferred laser intensity which is the intensity at which the energy of irradiation with the laser L reaches beyond one layer of the layer 12. As illustrated as the recess 21b and the recess 21c, when the laser intensity is set as the intensity at which the energy of irradiation with the laser L reaches beyond one layer of the layer 12, sometimes the molten residue 24 may remain in the recess 21. If the molten residue 24 remains in the recess portion 21, it is not preferable because unevenness may be formed on the layer 12 after the melting and solidifying step.

Figure 8:
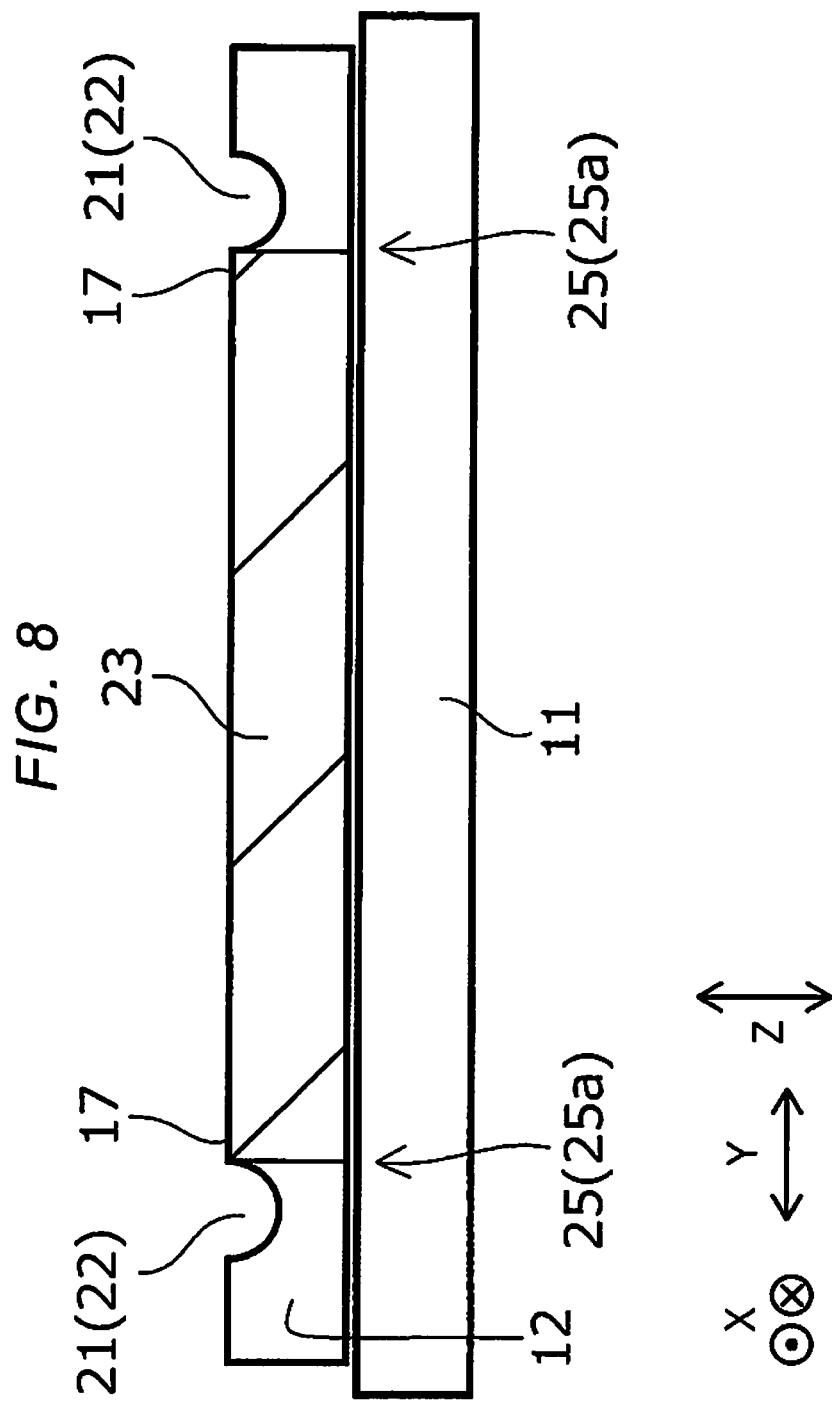
FIG. 8 is a cross-sectional view of a layer for explaining a laser irradiation position in the removal step in the method of manufacturing a three-dimensional shaped object according to an embodiment of the present disclosure, and is a schematic diagram illustrating a state in which an entire boundary region is irradiated with a laser in the removal step.
Figure 9:
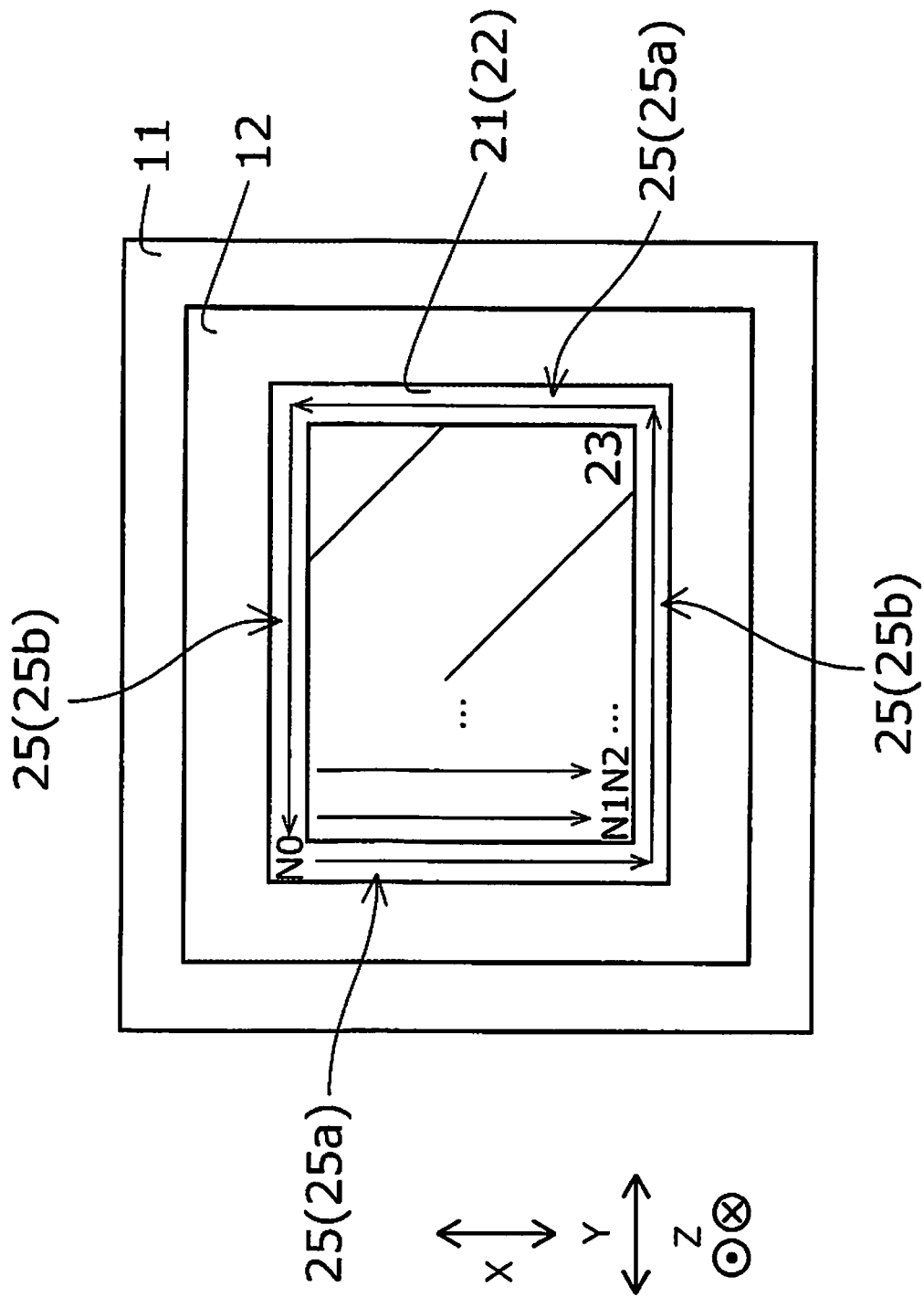
FIG. 9 is a plan view of a layer for explaining a laser irradiation position in the removal step in the method of manufacturing a three-dimensional shaped object according to an embodiment of the present disclosure, and is a schematic diagram illustrating a state in which the entire boundary region is irradiated with the laser in the removal step.

In addition, in the removal step in STEP S140, for example, as illustrated in FIG. 8 and FIG. 9, a part of the fluid material can be removed by irradiating the entire of the boundary region 25 of the shaping region 23 of the three-dimensional shaped object O on the layer 12 with the laser L. In addition, for example, as illustrated in FIG. 10, FIG. 11 and FIG. 12, a part of the fluid material can be removed by irradiating a part of the boundary region 25 of the shaping region 23 of the three-dimensional shaped object O on the layer 12 with the laser L.

Figure 10:
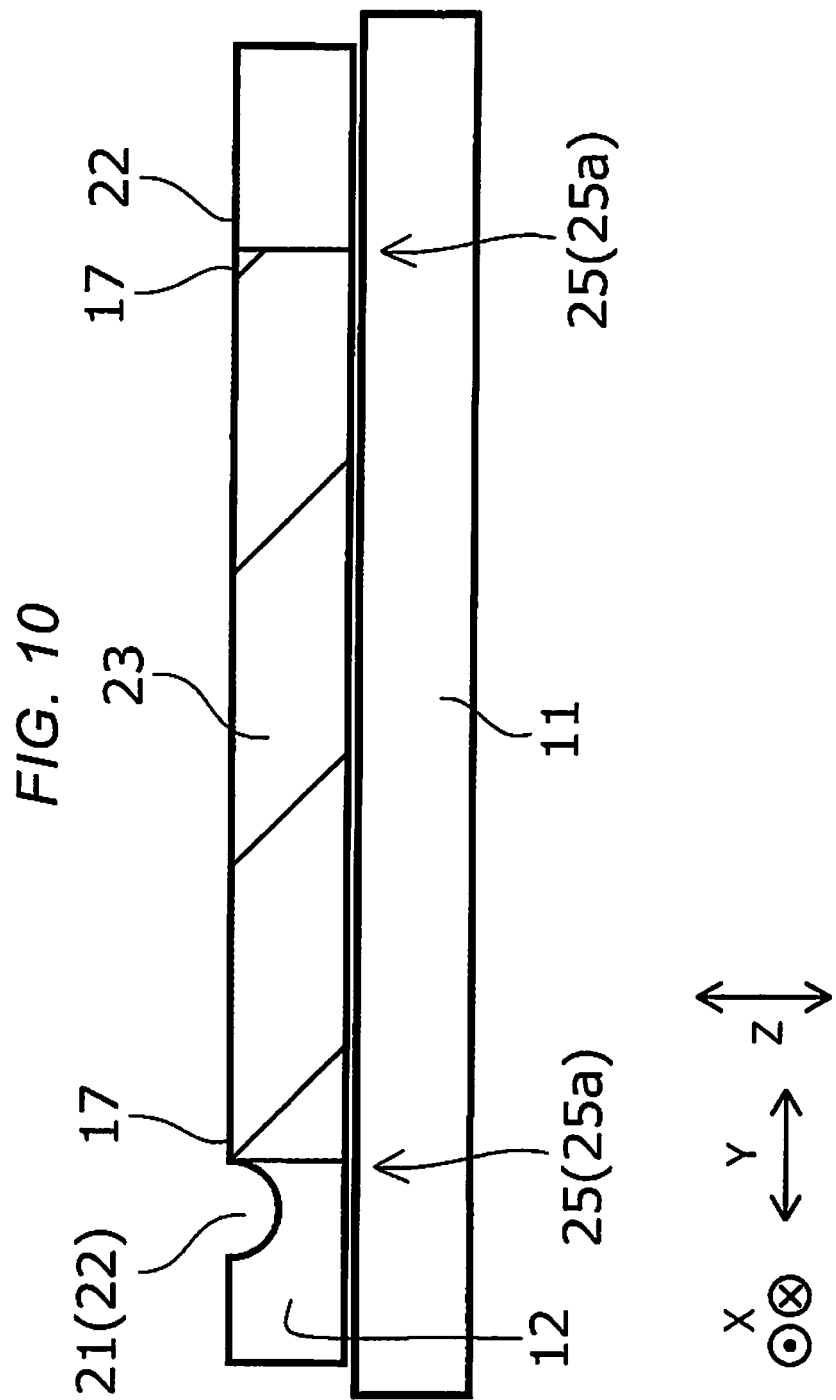
FIG. 10 is a cross-sectional view of a layer for explaining the laser irradiation position in the removal step in the method of manufacturing a three-dimensional shaped object according to an embodiment of the present disclosure, and is a schematic diagram illustrating a state in which a part of the boundary region is irradiated with the laser in the removal step.
Figure 11:
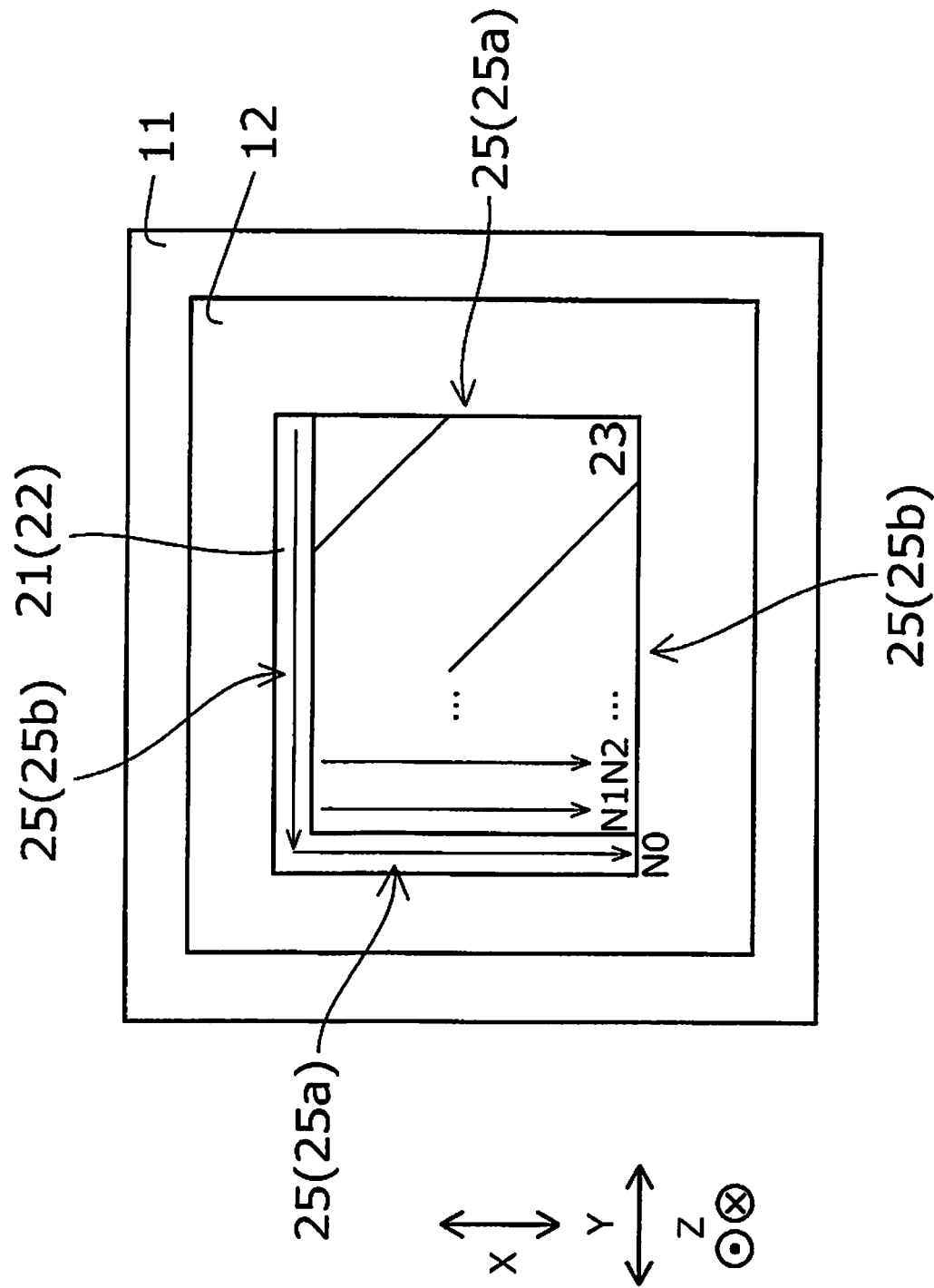
FIG. 11 is a plan view of a layer for explaining a laser irradiation position in the removal step in the method of manufacturing a three-dimensional shaped object according to an embodiment of the present disclosure, and is a schematic diagram illustrating a state in which a part of the boundary region is irradiated with the laser in the removal step.
Figure 12:
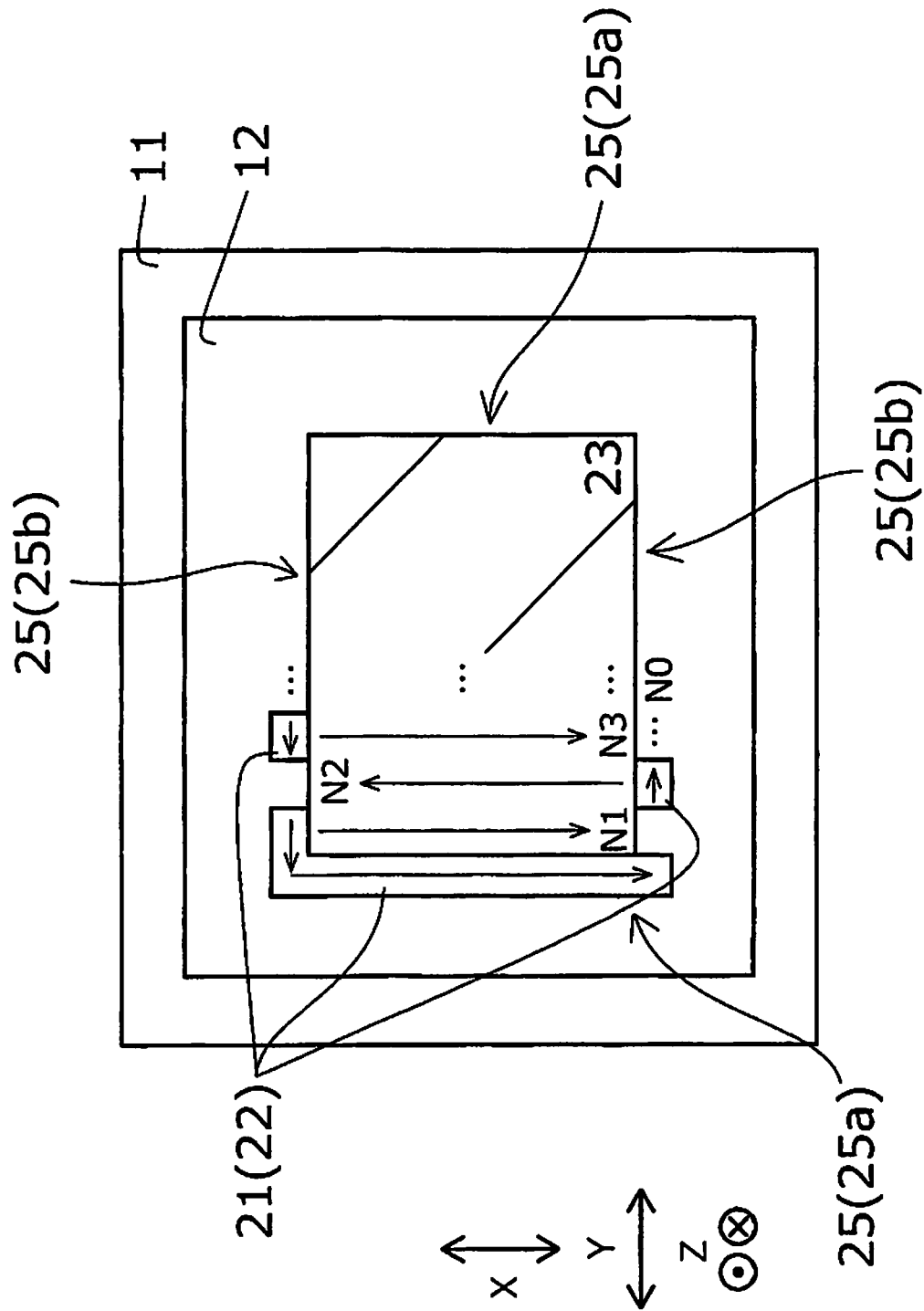
FIG. 12 is a plan view of a layer for explaining a laser irradiation position in the removal step in the method of manufacturing a three-dimensional shaped object according to an embodiment of the present disclosure, and is a schematic diagram illustrating a state in which a part of the boundary region different from the position in FIG. 11 is irradiated with the laser in the removal step.

Here, FIG. 10 and FIG. 11 correspond to a case where any of the first line, the second line, and so on, of the laser L are moved in the same direction in the melting and solidifying step in STEP 150, that is, correspond to a case where any line of a positions of irradiation start with the laser L in the melting and solidifying step are on the upper side of FIG. 11, which are the same. On the other hand, FIG. 12 corresponds to a case where the first line, the second line, and so on of the laser L are alternately moved in the reverse direction in the melting and solidifying step in STEP S150, that is, corresponds to a case where the positions of irradiation start with the laser L in the melting and solidifying step are on the alternately opposite side to the upper side and the lower side of the boundary region 25b of the shaping region 23 in FIG. 12. In short, in FIG. 8 and FIG. 9, the removal step in STEP S140, the entire of the boundary regions 25 at a position along the first line, a position along the last line, and a position corresponding to a start position and an end position of each line is irradiated with the laser L. In addition, in FIG. 10, FIG. 11 and FIG. 12, in the removal step in STEP S140, the boundary region 25 at a position along the first line and a position corresponding to the start position of each line is irradiated with the laser L.

Next, in the melting and solidifying step in STEP S150, the layer 12 is irradiated with the laser L from the laser emitter 20 to melt the constituent material of the three-dimensional shaped object O in the shaping region 23 of the layer 12, and after melting, the constituent material of the three-dimensional shaped object O is solidified by cooling or leaving it alone. By performing the present STEP, for example, the state is changed from the state in the fourth state diagram from the top of FIG. 3 to the state in the fifth state diagram from the top of FIG. 3, and then, a melted and solidified portion 19 of the first line is formed in the layer 12. For example, as the state changed from the state in the sixth state diagram from the top of FIG. 3 to the state in the state diagram at the bottom of FIG. 3, the melted and solidified portion 19 of the second line is formed in the layer 12, and similarly the melted and solidified portion 19 of the third line, fourth line, and the entire region of the shaping region 23 are formed in the layer 12. In the removal step in STEP S140 and the melting and solidifying step in STEP S150, since layer 12 is irradiated with the laser L from the same laser emitter 20, the above-described processing can be collectively considered as one laser irradiation processing.

In determination processing STEP S160, it is determined whether the layer formation based on the shaping data input in STEP S110 is ended completely or not by the controller 3. If it is determined that the layer formation is not ended completely, the process returns to STEP S120 to form the next layer 12. On the other hand, if it is determined that the layer formation is ended completely, the method of manufacturing the three-dimensional shaped object in the present application example ends.

Figure 4:
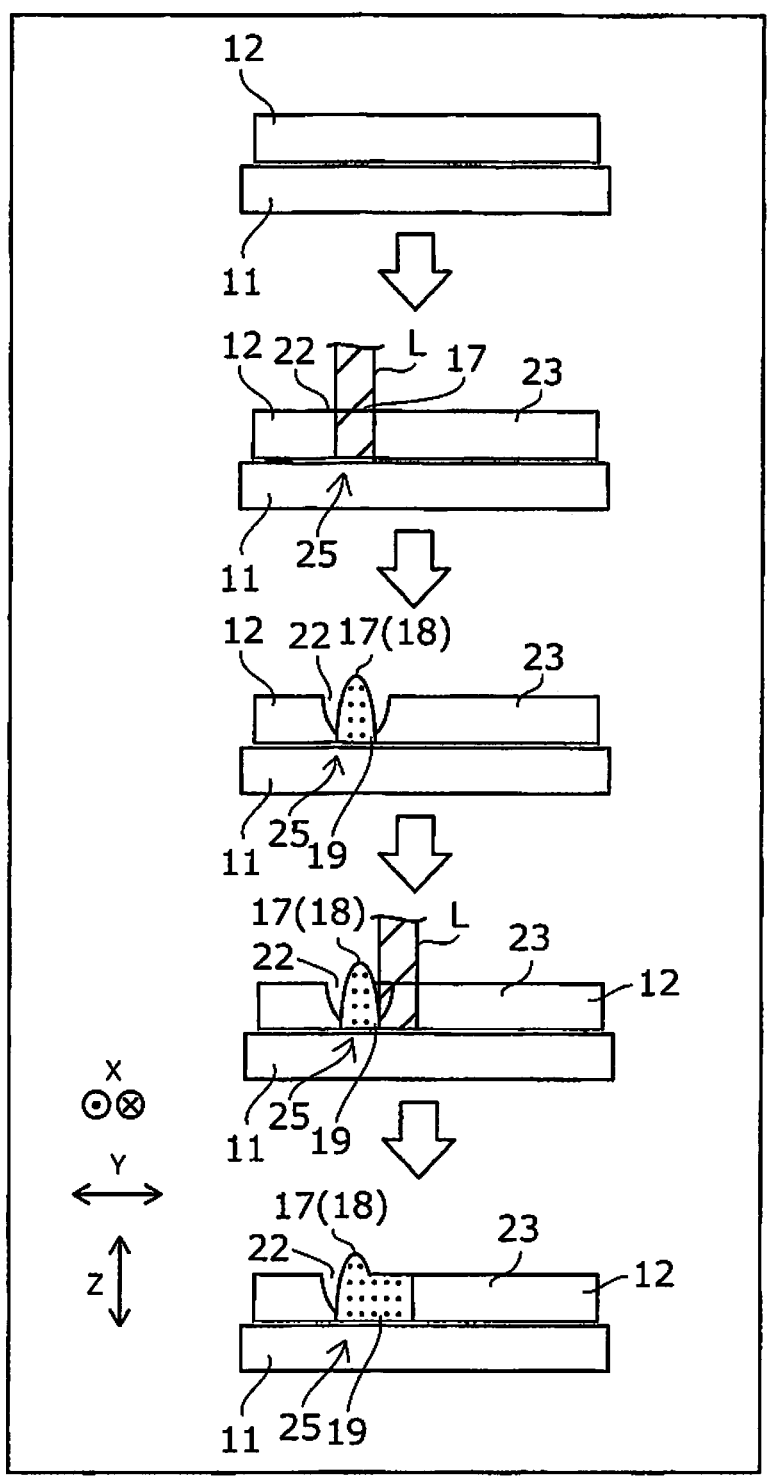
FIG. 4 is a cross-sectional view of a layer when the removal step is not performed in the method of manufacturing the three-dimensional shaped object according to an embodiment of the present disclosure.

Here, the reason why the removal step in STEP S140 is performed will be described with reference to FIG. 3 and FIG. 4. First, a case where the three-dimensional shaped object O is manufactured without performing the removal step in STEP S140 will be described with reference to FIG. 4. From the state in which the layer 12 is formed on the shaping stand 11 as illustrated in the state diagram at the top of FIG. 4, as the melting and solidifying step, when the end portion 17 of the shaping region 23 of the three-dimensional shaped object O in the layer 12 is irradiated with the laser L of the first line as illustrated in the second state diagram from the top of FIG. 4, since the heat reaches both sides of the laser L irradiation position in the Y direction, a part of the fluid material on both sides is also drawn in, and then the melted and solidified portion 19 of the first line is formed as illustrated in the third state diagram from the top of FIG. 4. On the other hand, from the second and subsequent lines, since the melted and solidified portion 19 is formed on one side in the Y direction, the fluid material of only one side where the melted and solidified portion 19 is not formed, that is, the fluid material of only one side of the laser L irradiation position in the Y direction is partially drawn in, and then, one line of melted and solidified portion 19 is formed as illustrated in the fourth state diagram from the top of FIG. 4. For this reason, for the first line, and the second and subsequent lines, the amounts of constituent material of the three-dimensional shaped object O used to form the melted and solidified portion 19 are different from each other. Only the amount of the constituent material of the three-dimensional shaped object O used to form the melted and solidified portion 19 of the first line is increased. Therefore, as illustrated in the state diagram at the bottom of FIG. 4, a projection 18 is formed at a position corresponding to the melted and solidified portion 19 in the first line, that is, at the end portion 17 of the shaping region 23.

On the other hand, as illustrated in FIG. 3, if the removal step in STEP S140 is performed, when forming the melted and solidified portion 19 of the first line, since a part of the fluid material in the boundary region 25 is removed, the amount of constituent material of the three-dimensional shaped object O used to form the melted and solidified portion 19 for one line can be made uniform between the first line, and the second and subsequent lines. Therefore, as illustrated in the state diagram at the bottom of FIG. 3, it is possible to prevent the projection from being formed at a position corresponding to the melted and solidified portion 19 of the first line.

In the description above, a case was described, where the projection 18 is easily formed at a position corresponding to the melted and solidified portion 19 of the first line when manufacturing the three-dimensional shaped object O without performing the removing processing. That is, a case where the protruding portion is easily formed along the direction of the first line in the boundary region 25 was described. However, at the position of irradiation start with the laser L in the melting and solidifying step in the boundary region 25, that is, that is, at the start position of the arrow direction N1, the arrow direction N2, and so on in FIG. 9, FIG. 11 and FIG. 12, the protruding portion is also easily formed on not only at the position corresponding to the first line but also at position corresponding to the second and subsequent lines. Although not as much as the protruding portion along the line direction of the first line or the protruding portion formed in the laser L irradiation start position in the melting and solidifying step, in some cases, the protruding portion may also be formed in the other boundary region 25 of the shaping region 23 of the three-dimensional structure O. In the method of manufacturing the three-dimensional shaped object in the present application example, a part of the fluid material in any part of the boundary region 25 can be removed in the removal step.

Here, for summarizing, the method of manufacturing the three-dimensional shaped object in the present application example is a method of manufacturing the three-dimensional shaped object O by laminating layer 12 as described above. Corresponding to STEP S120, the method has the layer formation step of forming the layer 12 using the fluid material containing powder and binder. In addition, corresponding to STEP S140, the method has the removal step of removing a part of the fluid material in the boundary region 25 by irradiating the boundary region 25 that includes at least one of the end portion 17 of the shaping region 23 of the three-dimensional shaped object O in the layer 12 and the outer portion 22 of the shaping region 23 adjacent to the end portion 17 with the laser L, and by scattering a part of the fluid material. In addition, corresponding to STEP S150, the method has the melting and solidifying step of melting the fluid material in the shaping region 23 by performing the irradiation with the laser L, and then, solidifying the fluid material.

As described above, when the layer 12 is irradiated with the laser L to melt the fluid material, the fluid material is melted by drawing the fluid material around the laser L irradiation position. Therefore, as illustrated in the state diagram at the bottom of FIG. 4, at the position of the first line which is a first line when moving the laser L irradiation position in a line shape or at the laser L irradiation start position, there is a tendency that much of the fluid material is drawn and melted because there is fluid material all around those positions and that the protruding portion like the projection 18 is generated in the layer 12. When the protruding portion is generated, the manufacturing accuracy of the three-dimensional shaped object O decreases. On the other hand, in the method of manufacturing the three-dimensional shaped object present application example, since a part of the fluid material in the boundary region 25 is removed in removal step, it is possible to prevent the protruding portion from being generated. Therefore, by performing the method of manufacturing the three-dimensional shaped object present application example, it is possible to manufacture a high-quality three-dimensional shaped object O. Since both the removal step and the melting and solidifying step are performed by irradiating the layer 12 with the laser L, since these can be considered as one irradiation processing with the laser L, it is possible to suppress the increase of number of processing. That is, by performing the method of manufacturing the three-dimensional shaped object present application example, it is possible to manufacture a high-quality three-dimensional shaped object O without increasing the number of processing.

In addition, as described above, in the method of manufacturing the three-dimensional shaped object present application example, as illustrated in FIG. 9, FIG. 11 and FIG. 12, it is possible to make the position where the recess portion 21 corresponding to the position of laser L irradiation in the removal step include the boundary region 25 at each start position of the arrow direction N1, the arrow direction N2, and so on corresponding to the laser L irradiation start position in the melting and solidifying step. As described above, by making the laser L irradiation position in the removal step include the boundary region 25 in the laser L irradiation start position in the melting and solidifying step, a part of the fluid material at the laser L irradiation start position in the melting and solidifying step in which the protruding portion is easily generated, can be removed. Thus, it is possible to effectively prevent the protruding portion from being generated in the layer 12.

In addition, as described above, in the method of manufacturing the three-dimensional shaped object in the present application example, as illustrated in FIG. 9, FIG. 11 and FIG. 12, since the irradiation with the laser L in the melting and solidifying step is performed by moving the laser L irradiation position in a line shape, the laser L irradiation position in the removal step can include a boundary region 25a in the width direction of the line in the boundary region 25. When moving the laser L irradiation position in a line shape, particularly the protruding portion is easily generated at the position of the first line accompanying especially with the laser irradiation on the first line which is the first line. However, since a part of the fluid material of the boundary region 25a in the width direction of the line, that is, for example, a part of the fluid material of the boundary region 25a on the first line side can be removed, and thus, it is possible to effectively prevent the protruding portion from being generated in the layer 12.

In addition, as described above, in the method of manufacturing the three-dimensional shaped object in the present application example, as illustrated in FIG. 9, the laser L irradiation position in the removal step can include the boundary region 25 around the entire shaping region 23. That is, by performing the method of manufacturing the three-dimensional shaped object in the present application example, since a part of the fluid material is removed in all the areas where the protruding portion is easily generated, it is possible to effectively prevent the protruding portion from being generated in the layer 12.

The present disclosure is not limited to the application example described above, and can be realized with various configurations without departing from the spirit of the present disclosure. For example, the technical features in the application example corresponding to the technical features in each aspect described in the summary of the disclosure can be appropriately replaced or combined in order to solve a part or all of the above-described problems to be solved or to achieve a part or all of the above-described effects. Further, if the technical feature is not described as essential in the present specification, it can be deleted as appropriate.

What is claimed is:

1. A method of manufacturing a three-dimensional shaped object in which the three-dimensional shaped object is manufactured by laminating layers, the method comprising:
   a layer formation step of forming a layer using a material containing powder and a binder;
   a removal step of removing a portion of the material in a boundary region to form a recess in the boundary region by irradiating the boundary region with a laser, the boundary region including at least one of an end portion of a shaping region of the three-dimensional shaped object in the layer and an outer portion of the shaping region adjacent to the end portion; and
   a melting and solidifying step of melting and solidifying the material after melting in the shaping region by performing irradiation with the laser.

2. The method of manufacturing a three-dimensional shaped object according to claim 1, wherein
   a laser irradiation position in the removal step includes the boundary region in a laser irradiation start position in the melting and solidifying step.

3. The method of manufacturing a three-dimensional shaped object according to claim 1, wherein
   the irradiation with the laser in the melting and solidifying step is performed by moving the laser irradiation position in a line shape, and a laser irradiation position in the removal step includes the boundary region in a width direction of the line.

4. The method of manufacturing a three-dimensional shaped object according to claim 1, wherein
   a laser irradiation position in the removal step includes the boundary region around an entire periphery of the shaping region.

5. The method of manufacturing a three-dimensional shaped object according to claim 1, wherein
   a laser intensity in the removal step is an intensity at which a laser irradiation position is heated equal to or higher than a thermal decomposition temperature of the binder.

6. The method of manufacturing a three-dimensional shaped object according to claim 1, wherein
   a laser intensity in the removal step is lower than an intensity at which energy of irradiation with the laser reaches beyond one layer of the layers.

7. The method of manufacturing a three-dimensional shaped object according to claim 1, wherein
   in the removal step, the portion of the material in the boundary region is removed by irradiating only the boundary region with the laser.

* * * * *